United States Patent [19]
Sugawara

[11] Patent Number: 5,940,565
[45] Date of Patent: Aug. 17, 1999

[54] FIBER OPTIC DEVICE, LIGHT RECEIVING MEMBER, AND PATTERN ACQUISITION APPARATUS

[75] Inventor: Takeo Sugawara, Hamamatsu, Japan

[73] Assignee: Hamamatsu Photonics K.K., Hamamatsu, Japan

[21] Appl. No.: 08/898,675

[22] Filed: Jul. 22, 1997

[30] Foreign Application Priority Data

Jul. 24, 1996 [JP] Japan .................................. 8-195077

[51] Int. Cl.⁶ .................................................. G02B 6/04
[52] U.S. Cl. .......................... 385/115; 385/120; 385/147; 385/901; 362/554; 362/556
[58] Field of Search .................................. 385/115, 116, 385/119, 120, 147, 901; 362/32, 554, 556, 560; 356/71; 250/227.11, 227.2, 227.24

[56] References Cited

U.S. PATENT DOCUMENTS

| | | | |
|---|---|---|---|
| 3,323,886 | 6/1967 | Hays | 65/4 |
| 3,402,000 | 9/1968 | Crawford | 350/96 |
| 3,797,910 | 3/1974 | Westwig | 350/96 |
| 3,906,520 | 9/1975 | Phillips | 354/62 |
| 4,932,776 | 6/1990 | Dowling, Jr. et al. | 356/71 |
| 5,426,296 | 6/1995 | Shikai et al. | 250/227.2 |
| 5,684,905 | 11/1997 | Sugawara et al. | 385/120 |

FOREIGN PATENT DOCUMENTS

| | | |
|---|---|---|
| 42-21461 | 10/1967 | Japan . |
| 4-313737 | 11/1992 | Japan . |
| 7-174947 | 7/1995 | Japan . |

*Primary Examiner*—Phan Palmer
*Attorney, Agent, or Firm*—Pillsbury Madison & Sutro LLP

[57] ABSTRACT

The fiber optic device in accordance with the present invention has a structure in which two fiber optic members are connected together, end faces thereof opposing each other. The input-side fiber optic member comprises cores extending in a predetermined direction and a light absorber surrounding the cores. The output-side fiber optic member comprises cores extending in a predetermined direction, and a cladding surrounding the cores. The input end face of the input-side member is inclined with respect to core axes therein. In this device, the angle of inclination of the input end face of the input-side member or the angle formed between the output end face of the output-side member and each core axis in the output-side member can be set to a value relatively near to 90°. Accordingly, this device can be attached to a photodetector with relative ease. Also, a light receiving member formed by this attachment is relatively compact.

12 Claims, 14 Drawing Sheets

FIBER OPTIC DEVICE, LIGHT RECEIVING MEMBER, AND PATTERN ACQUISITION APPARATUS

BACKGROUND OF THE INVENTION

1. Field of the Invention

The present invention relates to a fiber optic device used for a pattern acquisition apparatus such as a fingerprint detecting apparatus.

2. Related Background Art

A fiber optic device disclosed in Japanese Patent Application Laid-Open No. 7-174947 has conventionally been known. FIG. 13 is a perspective view showing such a fiber optic device, whereas FIG. 14 is a partially vertical sectional view of this device 500 taken along line XIV—XIV of FIG. 13. This device 500 is typically used as means for transmitting an irregularity pattern image in an apparatus for acquiring an irregularity pattern of an object surface, such as a fingerprint detecting apparatus.

As shown in FIGS. 13 and 14, the fiber optic device 500 has a structure in which a plurality of optical fibers are bundled together so that their respective axes are in parallel to each other. The respective end faces of the optical fibers are collected so as to become flush with each other to form opposite end faces 502 and 504 of the device 500. The end faces 502 and 504 are faces to receive and to emit an optical image, respectively. The input end face 502 and the output end face 504 are made to be parallel to each other so that the optical image emitted from the output end face 504 is not distorted.

As shown in FIG. 14, each optical fiber constituting the device 500 comprises a core 512 in its center, a cladding 513 closely surrounding the core 512, and a light absorber 514 closely surrounding the cladding 513. Opposite end faces of each optical fiber are inclined with respect to an axis 518 of its core 512 at an angle $\alpha_0$, and thereby the input and output end faces 502 and 504 are also inclined with respect to each core axis 518 at an angle $\alpha_0$. In other words, respective normals 506 and 508 of the input and output end faces 502 and 504 are not in parallel to each axis 518 but each form an angle of $(90°-\alpha_0)$ with respect to each axis 518. This angle of inclination $\alpha_0$ is set to a value at which, even when light rays enter each core 512 from the air, these rays are not totally reflected at an interface between each core 512 and cladding 513. Namely, the angle of inclination $\alpha_0$ of the input and output end faces 502 and 504 is included in such an angle range that the incident angle of each light ray entering each core 512 from the air with respect to an interface between each core 512 and cladding 513 is not greater than the critical angle of reflection at this interface.

As is well known, such a range of angle of inclination $\alpha_0$ can be represented as $\alpha_0 \leq \alpha_{0m}$, where $\alpha_{0m}$ is a specific maximum angle of inclination. This $\alpha_{0m}$ is an angle satisfying the following three equations:

$n_{0core} \cdot \sin \phi_c = n_{0clad} \cdot \sin 90°$ (Snell's law at the interface between the core and the cladding), $n_{0core} \cdot \sin \beta_{0m} = n_a \cdot \sin 90°$ (Snell's law at the interface between the air and the core), and $\alpha_{0m} + (90° + \beta_{0m}) + (90° - \phi_c) = 180°$ (sum of interior angles of a triangle), where $n_{0core}$ is a refractive index of each core 512; $n_{0clad}$ is a refractive index of each cladding 513; $n_a$ is a refractive index of the air; $\phi_c$ is a critical angle of reflection at the interface between each core 512 and cladding 513; and $\beta_{0m}$ is an angle of refraction of an incident ray 520 on the input end face 502 at an incident angle of 90°. More specifically, $\beta_{0m}$ is an angle formed between the normal 506 of the input end face 502 and a refracted ray 521 of the incident ray 520.

By using $\alpha_{0m}$ determined from the above three equations, the range of angle of inclination $\alpha_0$ can be represented as:

$$\alpha_0 \leq \alpha_{0m} = \sin^{-1}(n_{0clad}/n_{0core}) - \sin^{-1}(n_a/n_{0core}). \tag{1}$$

SUMMARY OF THE INVENTION

It is an object of the present invention to provide a fiber optic device which can easily be attached to a photodetector and can form a compact light receiving member for pattern acquisition.

In order to achieve the above-mentioned object, the fiber optic device in accordance with the present invention comprises first and second fiber optic members. The first fiber optic member includes a plurality of first cores substantially in parallel to each other extending in a predetermined direction, and a first light absorber which surrounds the side face of each of the cores and has an absorption coefficient greater than that of each of the first cores with respect to at least one wavelength of light. Opposite end faces of these cores and of the first light absorber are respectively collected so as to become flush with each other to form input and output end faces of the first member. The second fiber optic member includes a plurality of second cores substantially in parallel to each other extending a predetermined direction, and a cladding which surrounds the side face of each of the second cores and has a refractive index lower than that of each second core. Opposite end faces of these cores and of the cladding are respectively collected so as to become flush with each other to form input and output end faces of the second member. The second member is connected to the first member so that the input end face of the second member opposes the output end face of the first member. The input end face of the first member is inclined with respect to the axis of each of the first cores at a predetermined angle $\alpha_1$.

In this fiber optic device, the angle of inclination $\alpha_1$ of the input end face of the first member and an angle formed between the output end face of the second member and an axis of each of the second cores can be set to a value relatively near to 90°. Accordingly, this device can easily be attached to a photodetector, and a light receiving member formed by this attachment can be made compact.

Assuming that the refractive indices of the air and each of the first cores are $n_a$ and $n_{1core}$ respectively, when the angle $\alpha_1$ is set so as to satisfy a relationship of $\alpha_1 \leq 90° - \sin^{-1}(n_a/n_{1core})$, substantially all rays of light entering each first core from the air are absorbed by the first light absorber to be attenuated or removed. As a result, an irregularity pattern of an object surface in close contact with the input end face of the first member is transmitted with a high contrast.

The angle formed between the input end face of the second member and the axis of each of the second cores may be set so that light rays entering each second core from the first member are incident on the interface between each of the second cores and the cladding at an incident angle not smaller than the critical angle at this interface. In this configuration, the light rays are totally reflected at this interface and thereby the light rays can be transmitted through the second member with efficiency.

The angle formed between the output end face of the second member and the axis of each second core may be set so that light rays entering each second core from the first member are emitted from the output end face of the second member in a direction perpendicular to this end face. In this configuration, regardless of the medium adjacent to the output end face of the second member, the light rays can be emitted from this end face.

The input and output end faces of the first member may be substantially parallel to each other, the input and output end faces of the second member also may be substantially parallel to each other, and further, the first and second fiber optic members may be connected together so that the output end face of the first member and the input end face of the second member are substantially parallel to each other. In this configuration, assuming that the refractive index of each of the first cores is $n_{1core}$, the refractive index of each of the second cores is $n_{2core}$, and the refractive index of the cladding is $n_{2clad}$, it is preferred that angle $\alpha_2$ formed between the end face of the second member and the axis of each second core satisfies a relationship of $\cos^{-1}(n_{1core} \cdot \cos \alpha_1/n_{2core}) - \cos^{-1}(n_{2clad}/n_{2core}) \leq \alpha_2 \leq \cos^{-1}(n_{1core} \cdot \cos \alpha_1/n_{2core}) + \cos^{-1}(n_{2clad}/n_{2core})$. When this inequality is satisfied, substantially all rays of light from the first member are totally reflected at the interface between each second core and the cladding and thereby the light rays can be transmitted through the second member with efficiency. More preferably, the angle $\alpha_2$ satisfies an equation of $\alpha_2 = (\cos^{-1}(n_{1core} \cdot \cos \alpha_1/n_{2core}) + 90°)/2$. When this equation is satisfied, the light rays entering each second core are emitted from the output end face of the second member in a direction perpendicular to this end face. Accordingly, regardless of the medium adjacent to the output end face of the second member, the light rays can be emitted from this end face.

The first and second fiber optic members may be connected to each other with a seal layer, which is made of a light transmissive material, disposed between the output end face of the first member and the input end face of the second member. In this configuration, the air can be kept from intervening between the output end face of the first member and the input end face of the second member.

The second member may further include a second light absorber which is in contact with the cladding, extends along the cladding, and has an absorption coefficient greater than that of the cladding with respect to at least one wavelength of light. Opposite end faces of the second light absorber may respectively terminate at the input and output end faces of the second member. When the second member comprises such a light absorber, the light propagating through the cladding of the second member is absorbed by this light absorber to be attenuated or removed. Thus the phenomenon that is restrained or prevented from occurring is that in which light incident on the cladding from the first member enters the second cores to coexist with the core-propagating light, thereby degrading the resolution of a pattern image transmitted by this device.

The first cores may be spaced uniformly so that the distance between the axes of the neighboring first cores is set to a predetermined value, and the second cores may be spaced uniformly so that the distance between the axes of the neighboring second cores is set to a value smaller than the said predetermined value. In this configuration, the end faces of the first cores oppose the end faces of the second cores with efficiency, which enables the efficient transmission of the light from the first member to the second member.

In accordance with another aspect of the present invention, provided is a light receiving member comprising the above-mentioned fiber optic device and a photodetector which converts an optical image incident on its light receiving surface into an electric signal and outputs this electric signal. Here, the photodetector is disposed so that an optical image emitted through the output end face of the second member in the fiber optic device enters the light receiving surface.

In accordance with still another aspect of the present invention, provided is a pattern acquisition apparatus comprising the above light receiving member and a light source for illuminating the input end face of the first member in the fiber optic device included in the light receiving member.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

FIGS. 1 to 4 are views showing a configuration of a fiber optic device in accordance with one embodiment of the present invention. Namely, FIGS. 1 to 4 respectively are an overall perspective view of the fiber optic device, a partially vertical sectional view of the fiber optic device taken along line II—II of FIG. 1, a partially transverse sectional view of the fiber optic device taken along line III—III of FIG. 2, and a partially transverse sectional view of the fiber optic device taken along line IV—IV of FIG. 2. For the convenience of explanation, FIG. 1 also shows an XYZ rectangular coordinate system.

Figure 1:
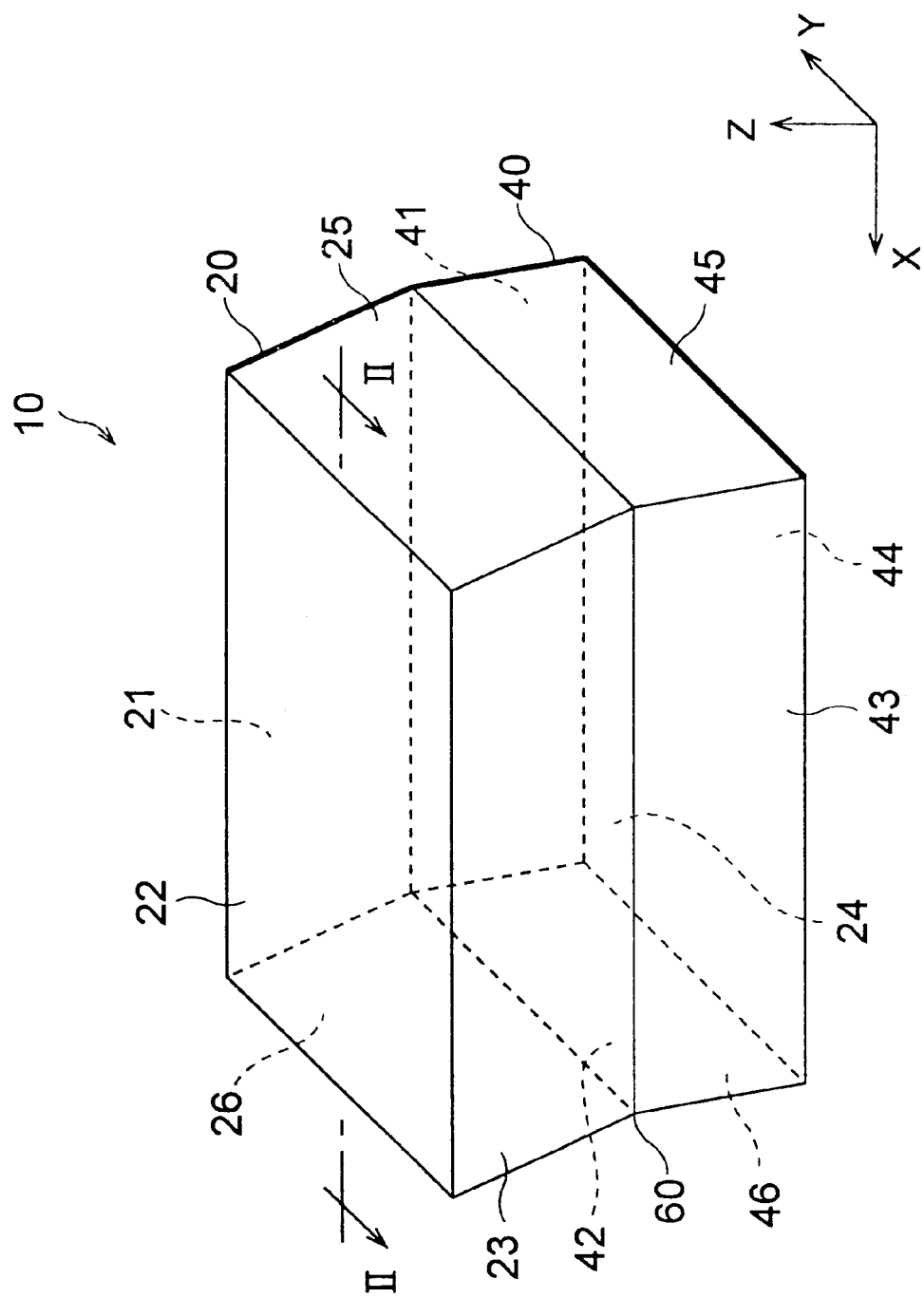
FIG. 1 is an overall perspective view showing a fiber optic device in accordance with one embodiment of the present invention.

As shown in FIG. 1, a fiber optic device 10 in accordance with this embodiment comprises two fiber optic members 20 and 40, which are connected together in series so that their respective side faces 24 and 42 oppose each other. The first fiber optic member 20 is a parallelepiped comprising rectangular side faces 22, 24, 25, and 26 and parallelogrammatic side faces 21 and 23. The member 20 is formed like a quadrangular prism extending in the Y-axis direction in FIG. 1, where the side faces 21 and 23 within ZX planes are upper and lower faces of the prism, respectively. Similarly, the second fiber optic member 40 is a parallelepiped comprising rectangular side faces 42, 44, 45, and 46 and parallelogrammatic side faces 41 and 43, which is formed like a quadrangular prism extending along the Y-axis direction in FIG. 1, where the side faces 41 and 43 within ZX planes are upper and lower faces of the prism, respectively. All the side faces 22 and 24 of the first member 20 and the side faces 42 and 44 of the second member 20 are within XY planes and therefore parallel to each other, and having substantially the same area.

Figure 2:
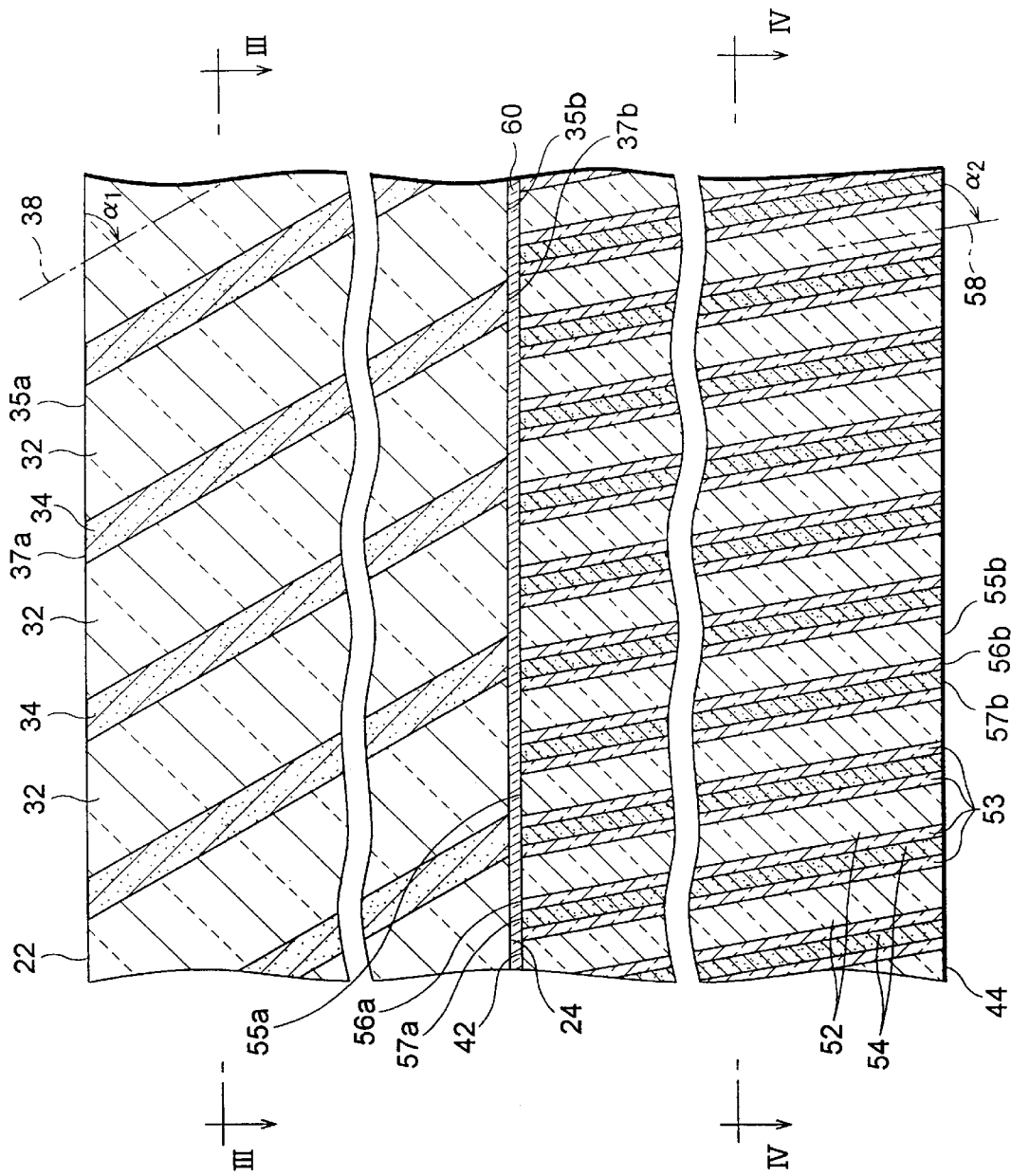
FIG. 2 is a partially vertical sectional view of the fiber optic device taken along line II—II of FIG. 1.

As is most clearly shown in FIG. 2, the first member 20 and the second member 40 are bonded together by means of a transparent optical adhesive 60, where the side face 24 of the former and the side face 42 of the latter oppose each other substantially in parallel. As the optical adhesive 60, any of balsams, epoxy resin adhesives, ultraviolet curing resins, and the like can be used. In this embodiment, well-known Cemedine-1565, which is one of epoxy resin adhesives, is used as the optical adhesive 60.

Figure 3:
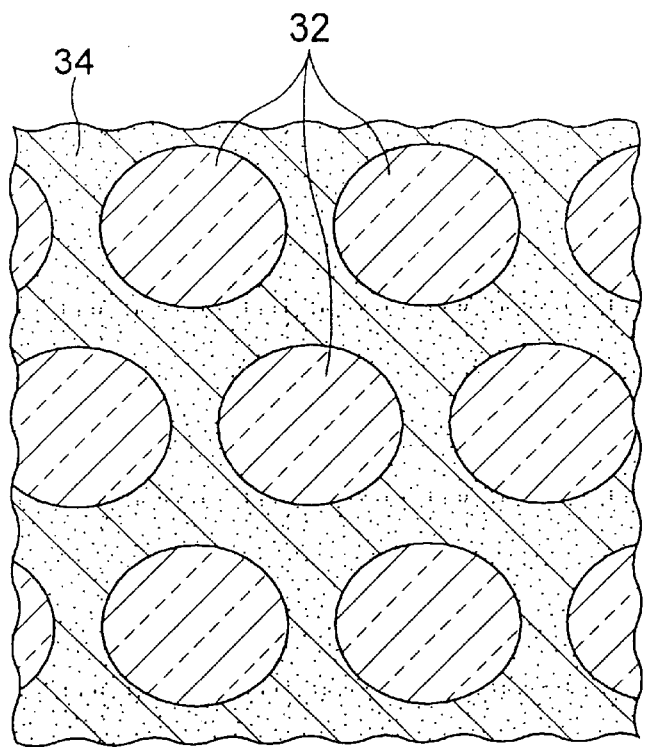
FIG. 3 is a partially transverse sectional view of the fiber optic device taken along line III—III of FIG. 2.

With reference to FIGS. 2 and 3, the configuration of the first fiber optic member 20 will be explained. As shown in FIG. 2, the first member 20 comprises a plurality of rod-shaped cores 32 which serve as light transmitting portions. These cores 32 extend so that their respective axes 38 become substantially parallel to each other with substantially uniform intervals. Each core 32 has a circular cross-section perpendicular to its axis 38. Opposite end faces 35a and 35b of each core 32 are substantially parallel to each other, while being inclined with respect to each core axis 38 at a predetermined angle $\alpha_1$. This angle of inclination $\alpha_1$ is defined as a clockwise angle taken from an orthogonal projection of the core axis 38 onto the core end face to the axis 38 in FIG. 2.

The side face of each core 32 is closely surrounded by a light absorber 34. The light absorber 34 is constituted by a material exhibiting an absorption coefficient greater than that of the material of each core 32 in the whole visible light region. The light absorber 34 intervenes between the cores 32 while extending in the same direction as the cores 32. As with the end faces 35a and 35b of each core 32, opposite end faces 37a and 37b of the light absorber 34 are substantially in parallel to each other, while inclining with respect to each core axis 38 at the predetermined angle $\alpha_1$. The end faces 35a and 37a, and the end faces 35b and 37b are collected so as to substantially become flush with each other, respectively, thereby forming the side faces 22 and 24 of the first member 20.

Thus, the fiber optic member 20 has a structure in which the cores 32 and the light absorber 34 extend in a specific direction, and in which the side faces 22 and 24 respectively form opposite end faces of the member 20. The end faces 22 and 24 respectively serve as faces to receive and to emit an optical image when the member 20 is used as optical image transmitting means. Consequently, the faces 22 and 24 will respectively be referred to as input and output end faces of the member 20 in the following. The input end face 22 of the member 20 also functions as the input end face of the fiber optic device 10.

The cores 32 and light absorber 34 can be constituted by any material which has conventionally been used for forming typical fiber optic devices. For instance, examples of composition for the light absorber are disclosed in U.S. Pat. No. 3,797,910 issued Mar. 19, 1974, which is incorporated herein by reference. A glass-type light absorber used in general contains various coloring oxides such as NiO, $Co_2O_3$, CuO, $Fe_2O_3$, and $MnO_2$. Compositions of the cores 32 and light absorber 34 in accordance with this embodiment are shown in the following table.

TABLE 1

|  | Core | Light absorber (wt %) |
| --- | --- | --- |
| $SiO_2$ | 19 | 48 |
| $Al_2O_3$ | 1 |  |
| $Na_2O$ |  |  |
| $K_2O$ | 0.5 | 15 |
| PbO | 79.5 | 31 |
| $MnO_2$ |  | 5 |
| $Cr_2O_3$ |  | 1 |
| Total | 100 | 100 |
| Refractive index | 1.92 | — |

Figure 5:
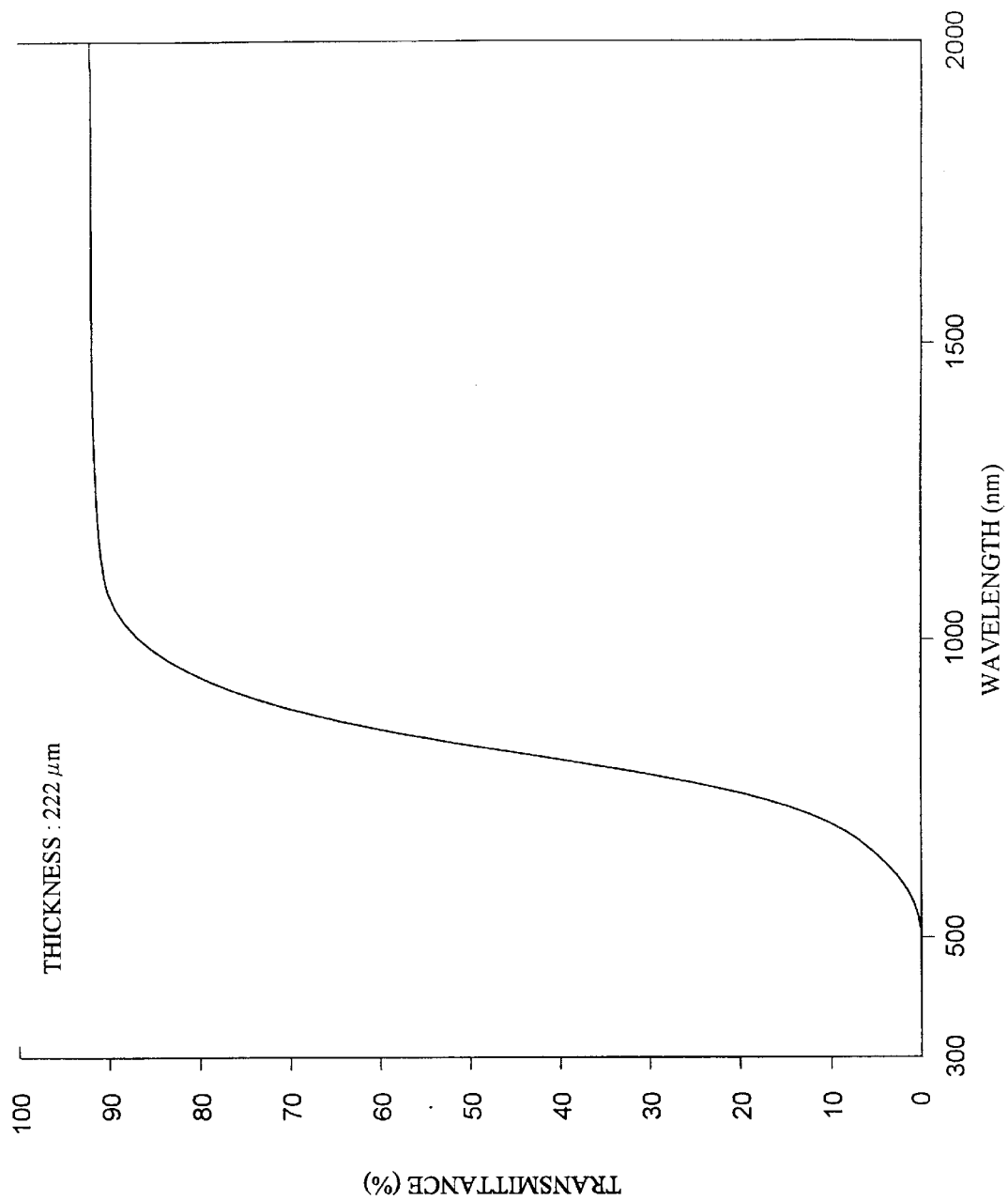
FIG. 5 is a spectrum showing spectral transmittance of a black glass constituting a light absorber in an input-side fiber optic member.

As shown in this table, each core 32 is constituted by a transparent glass composed of $SiO_2$, $Al_2O_3$, $K_2O$, and PbO and has a refractive index of 1.92. On the other hand, the light absorber 34 is a black glass composed of $SiO_2$, $K_2O$, PbO, $MnO_2$, and $Cr_2O_3$. FIG. 5 shows a spectrum of spectral transmittance of this black glass in the case where its thickness is 222 μm.

As is most clearly shown in FIG. 2, since both end faces 35a and 35b of each core 32 are inclined with respect to each core axis 38 at the angle $\alpha_1$, the input end face 22 and output end face 24 respectively including these end faces 35a and 35b are also inclined with respect to each axis 38 at the angle $\alpha_1$. In this embodiment, the angle of inclination $\alpha_1$ is set to an angle not greater than a predetermined maximum angle of inclination $\alpha_{1m}$ so that the rays of light incident on each core 32 from the air advance in a direction deviating from each axis 38. The maximum angle of inclination $\alpha_{1m}$ is an angle of inclination at which the light rays incident on each core 32 at an incident angle of 90° advance along each axis 38. In the following, with reference to FIG. 6, the angle $\alpha_{1m}$ will be explained.

Figure 6:
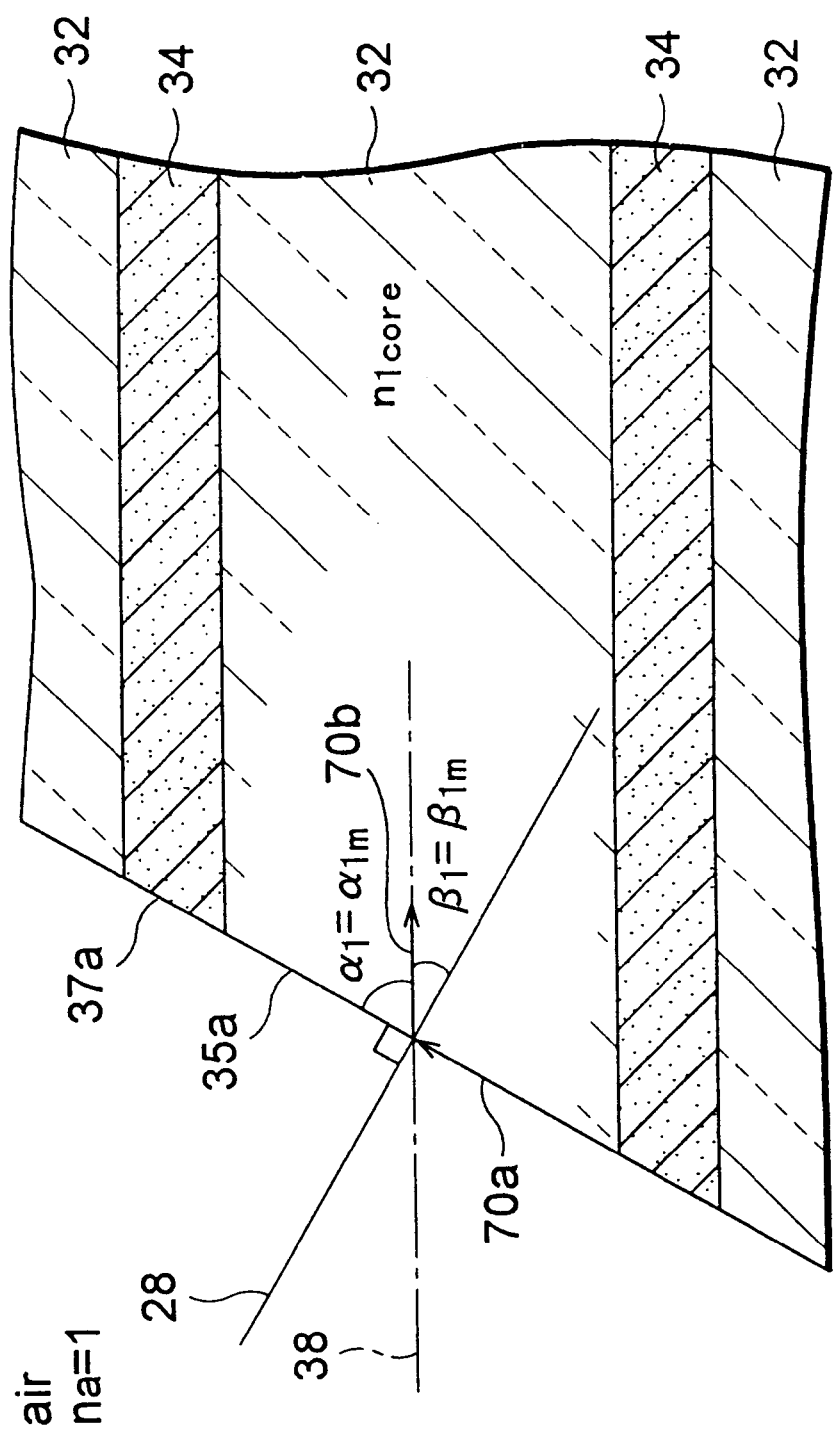
FIG. 6 is a partially enlarged vertical sectional view of the input-side fiber optic member in a case where the angle of inclination of its input end face is equal to the maximum angle of inclination.

FIG. 6 is a partially enlarged vertical sectional view of the fiber optic member 20 in the case where the angle of inclination $\alpha_1$ is equal to the maximum angle of inclination $\alpha_{1m}$. In FIG. 6, $n_{1core}$ and $n_a$ refer to the refractive indices of each core 32 and the air, respectively. Referred to with 70a is a light ray incident on the end face 35a of one of the cores 32 at an incident angle of 90°; 70b is a refracted ray in the core 32 of the incident ray 70a; and $\beta_1$ is an angle between the refracted ray 70b and a normal 28 of the end face 35a, that is, angle of refraction. In FIG. 6, an angle of refraction $\beta_1$ corresponds to the maximum angle of inclination $\alpha_{1m}$, and is represented as $\beta_{1m}$.

As shown in FIG. 6, the maximum angle of inclination $\alpha_{1m}$ is an angle of inclination at which light rays incident on each core 32 with an incident angle of 90°, such as ray 70a, advance therethrough along each axis 38. This angle $\alpha_{1m}$ can be determined from the following two equations:

$$n_a \cdot \sin 90° = n_{1core} \cdot \sin \beta_{1m}, \quad (2)$$

$$\alpha_{1m} + \beta_{1m} = 90°. \quad (3)$$

When these two equations are solved, we obtain $$\alpha_{1m} = 90° - \beta_{1m} \quad (4)$$
$$= 90° - \sin^{-1}(n_a/n_{1core}).$$

Assuming that $n_a = 1$, the above equation can be represented as:

$$\alpha_{1m} = 90° - \sin^{-1}(1/n_{1core}). \quad (5)$$

Figure 7:
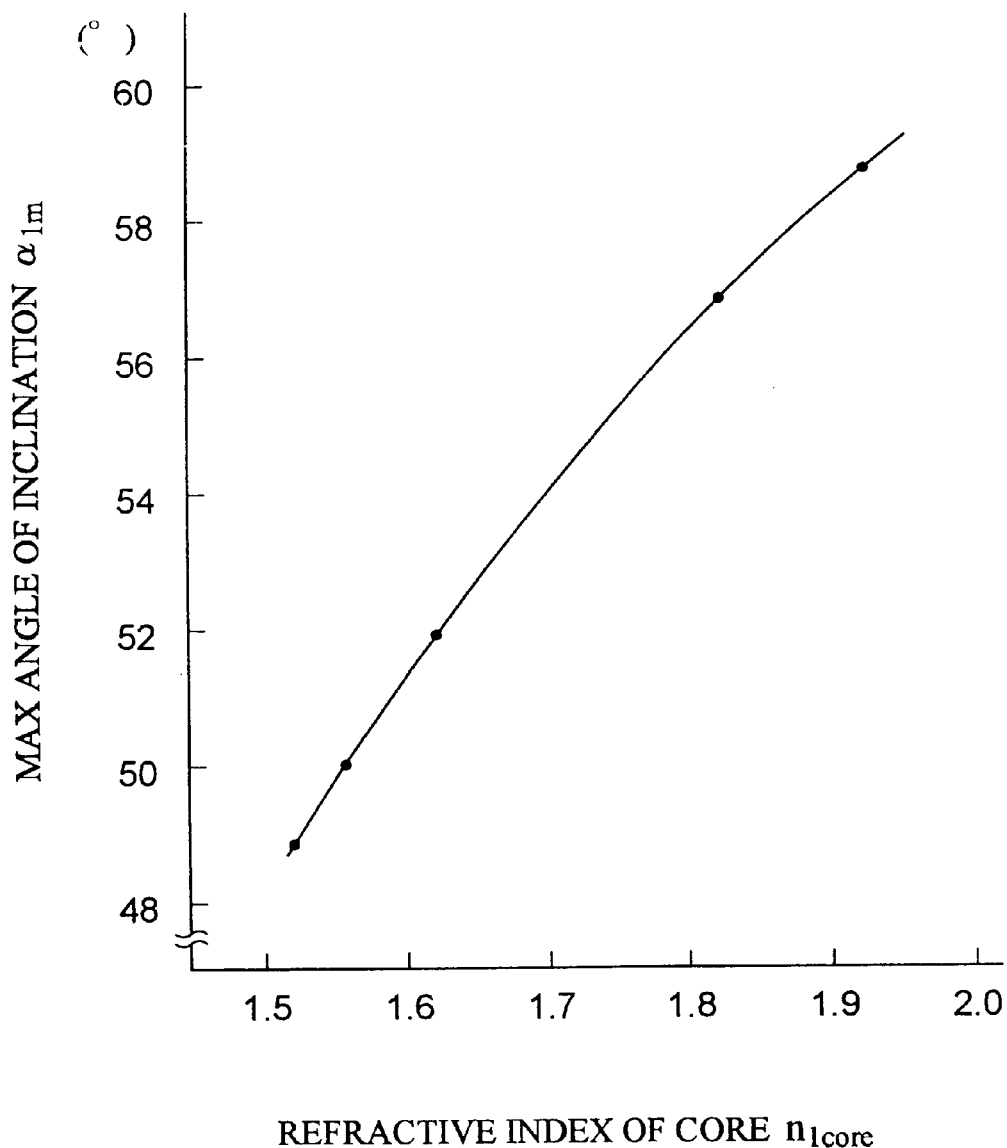
FIG. 7 is a graph showing a relationship between the refractive index of each core in the input-side fiber optic member and the maximum angle of inclination $\alpha_{1m}$ of its input end face.

FIG. 7 is a graph showing a relationship between the refractive index $n_{1core}$ and the angle $\alpha_{1m}$ according to the above equation (5). As can be seen from this graph, the higher the refractive index of each core 32 is, the greater the maximum angle of inclination becomes.

When the angle of inclination $\alpha_1$ of the end face 35a is equal to the above-mentioned maximum angle of inclination $\alpha_{1m}$, each of the light rays incident on the cores 32 from the air at an incident angle smaller than 90° has an angle of refraction smaller than $\beta_{1m}$. The refracted rays having such an angle of refraction advance in a direction deviating from the axial direction of each core 32 toward an interface between each core 32 and the light absorber 34 to be attenuated or removed as being absorbed by the light absorber 34. When the angle $\alpha_1$ is smaller than the angle $\alpha_{1m}$, all the incident rays incident on the cores 32 from the air at an incident angle not greater than 90° have an angle of refraction smaller than $\beta_{1m}$ to advance in a direction deviating from the axial direction of each core 32. This means that the rays incident on the cores 32 from the air at any incident angle are absorbed by the light absorber 34 to be attenuated or removed. Consequently, when the angle of inclination $\alpha_1$ is not greater than the maximum angle of inclination $\alpha_{1m}$, rays entering the cores 32 from the air through respective end faces 35a can substantially be prevented from propagating through each core 32.

In this embodiment, the refractive index of each core 32 is 1.92, and the value of the angle $\alpha_{1m}$ corresponding thereto is 58.6°. In this embodiment, the angle of inclination $\alpha_1$ is set to this value.

Figure 8:
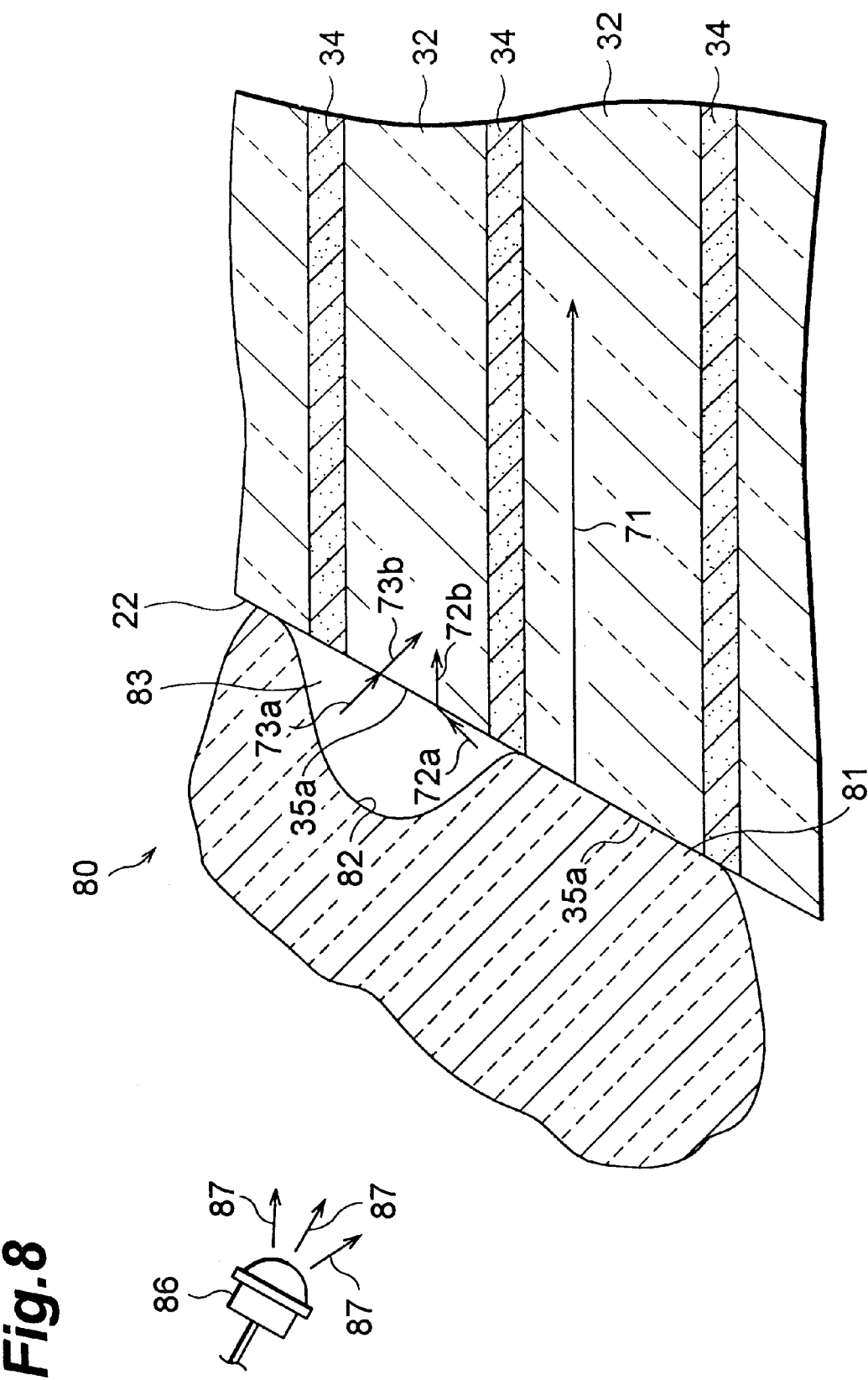
FIG. 8 is a partially enlarged vertical sectional view of the input-side fiber optic member, a finger being in close contact with the input end face of the said member.

FIG. 8 is a partially enlarged vertical sectional view showing an interior configuration of the member 20 near the input end face 22. In this figure, a finger 80, which is an example of an object to be detected, is in close contact with the input end face 22 and is irradiated with rays 87 from therebehind by means of a light source 86. Formed according to the structure of irregularities in the fingerprint are regions where the core end faces 35a are in close contact with protruded portions 81 of the finger 80, and regions where the end faces 35a and depressed portions 82 of the finger 80 are separated from each other by air gaps 83. Some of the rays 87 from the light source 86, such as rays 72a and 73a, are transmitted through the finger 80 and emitted from the depressed portions 82 to advance through the gaps 83 and enter the cores 32 through their respective end faces 35a. As mentioned above, refracted rays 72b and 73b of these rays 72a and 73a advance through one of the cores 32 in a direction deviating from the axial direction of the core 32 to be attenuated or removed by the light absorber 34. By contrast, in the regions where the protruded portions 81 and the core end faces 35a are in close contact with each other, the relationship between the incident angle and the angle of refraction at the end faces 35a changes from that in the noncontact region. This is because the refractive index of the finger 80 is greater than that of the air. Consequently, in the rays entering the cores 32 after being transmitted through the protruded portions 81, there exist rays, such as a ray 71 in FIG. 8, advancing in the axial direction of each core 32. Such rays propagate through the cores 32 without being absorbed by the light absorber 34 and reaches the end faces 35b opposite to the respective end faces 35a.

Thus, in the fiber optic member 20, substantially only the light rays incident on the cores 32 from the protruded portions 81 of the object surface in close contact with the input end face 22 can reach the output end face 24. The rays entering the cores 32 from the depressed portions 82 of the object surface after being transmitted through the gaps 83 are attenuated to be substantially extinguished, during its propagating process, as being absorbed by the light absorber 34. Consequently, a light and dark image corresponding to irregularities of the object's surface, i.e., irregularity pattern image of the object's surface, may be transmitted with a high contrast by the member 20 from the input end face 22 to the output end face 24.

Here, the above-mentioned maximum angle of inclination $\alpha_{0m}$ of the conventional fiber optic device will be compared with the maximum angle of inclination $\alpha_{1m}$ of the member 20. As mentioned above, assuming that the refractive indices of each core and cladding are $n_{0core}$ and $n_{0clad}$ respectively, the maximum angle of inclination $\alpha_{0m}$ in the conventional fiber optic device is:

$$\alpha_{0m} = \sin^{-1}(n_{0clad}/n_{0core}) - \sin^{-1}(n_a/n_{0core}). \quad (1)$$

By contrast, the maximum angle of inclination $\alpha_{1m}$ in the member 20 is $\alpha_{1m} = 90° - \sin^{-1}(n_a/n_{1core})$, as represented by the above equation (4). Accordingly, $\alpha_{0m} < \alpha_{1m}$ always holds true. This fact indicates that the angle of inclination at which the rays entering each core from the air are eliminated can be made greater by the member 20 having no cladding than by the conventional fiber optic device having a cladding. Therefore, the inclination of the side faces 25 and 26 with respect to the output end face 24 in the member 20 can be made relatively slight so that the width of the member 20 may be reduced.

As mentioned above, in the first fiber optic member 20, the input and output end faces 22 and 24 are inclined at an angle where the light rays incident on each core 32 from the air advance in a direction deviating from the axial direction of the core 32. Therefore, conversely, when the medium adjacent to the output end face 24 is the air, only the rays advancing through each core 32 in a direction deviating from its axis 38 can be emitted from the output end face 24. Namely, when the medium adjacent to the output end face 24 is the air, the light propagating through each core 32 along the axis thereof is totally reflected at its end face 35b, thus failing to be emitted therethrough. Accordingly, in connecting the first and second member 20 and 40 together, it is necessary that no air intervene between the output end face 24 of the member 20 and the input end face 42 of the member 40. In view of this point, the optical adhesive 60 is disposed between the output end face 24 and the input end face 42 in this embodiment. The adhesive 60 functions as a sealant for preventing air from intruding between these end faces.

Figure 4:
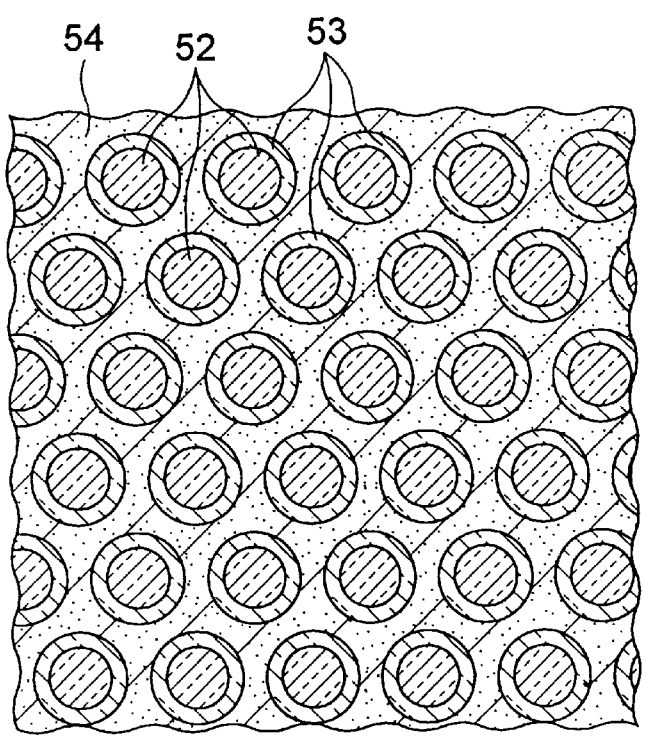
FIG. 4 is a partially transverse sectional view of the fiber optic device taken along line IV—IV of FIG. 2.

In the following, with reference to FIGS. 2 and 4, the configuration of the second fiber optic member 40 will be explained. As with the first fiber optic member 20, the second fiber optic member 40 comprises a plurality of rod-shaped cores 52 which serve as light transmitting portions. These cores 52 extend so that their respective axes 58 become substantially in parallel to each other with substantially uniform intervals. Each core 52 has a circular cross-section perpendicular to its axis 58. Opposite end faces 55a and 55b of each core 52 are substantially in parallel to each other, while inclining with respect to each core axis 58 at a predetermined angle $\alpha_2$. This angle of inclination $\alpha_2$ is defined as a clockwise angle taken from an orthogonal projection of the core axis 58 onto the core end face to the axis 58 in FIG. 2. The side faces of the cores 52 are closely surrounded by respective cylindrical claddings 53 extending in the same direction as the cores 52. As with the both end faces of each core 52, opposite end faces 56a and 56b of each cladding 53 are substantially in parallel to each other, while inclining with respect to each core axis 58 at the angle $\alpha_2$. Each cladding 53 has a refractive index lower than that of each core 52. The side face of each cladding 53 is closely surrounded by a light absorber 54. The light absorber 54 is constituted by a material exhibiting an absorption coefficient greater than that of the material of each cladding 53 in the whole visible light region. The light absorber 34 intervenes between the claddings 53 while extending in the same direction as the cores 52 and claddings 53. As with both end faces of each core 52 and cladding 53, opposite end faces 57a and 57b of the light absorber 54 are substantially parallel to each other, while being inclined with respect to each core axis 58 at the angle $\alpha_2$. The end faces 55a, 56a, and 57a and end faces 55b, 56b, and 57b are collected so as to substantially become flush with each other, respectively, thereby forming the side faces 42 and 44 of the second member 40.

Thus, the member 40 has a structure in which the cores 52, the claddings 53, and the light absorber 54 extend in a specific direction, and in which the side faces 42 and 44 respectively form opposite end faces of the member 40. The end faces 42 and 44 respectively serve as faces to receive and to emit an irregularity pattern emitted from the first member 20. Consequently, the faces 42 and 44 will respectively be referred to as input and output end faces of the second member 40 in the following. The output end face 44 of the member 40 also functions as the output end face of the present fiber optic device 10.

The pitch in arrangement of the cores 52 in the second member 40 is smaller than that of the cores 32 in the first member 20. In other words, the core density in the second member 40 is higher than that in the first member 20. As a result, when the first and second member 20 and 40 are connected together, the output end faces 35b of the cores 32 in the member 20 and the input end faces 55a of the cores 52 in the member 40 efficiently oppose each other. Thereby light can efficiently be transmitted from the first member 20 to the second member 40, and a bright optical image can be emitted from the present device 10.

As with the cores 32 and light absorber 34 in the first member 20, the cores 52, the claddings 53, and the light absorber 54 can be constituted by any material which has conventionally been used for forming typical fiber optic devices. Compositions of the cores 52, claddings 53, and light absorber 54 in accordance with this embodiment are shown in the following table.

TABLE 2

|  | Core | Cladding | Light absorber (wt %) |
|---|---|---|---|
| $SiO_2$ | 19 | 56 | 48 |
| $Al_2O_3$ | 1 | 2 |  |
| $Na_2O$ |  | 4 |  |
| $K_2O$ | 0.5 | 9 | 15 |
| PbO | 79.5 | 29 | 31 |
| $MnO_2$ |  |  | 5 |
| $Cr_2O_3$ |  |  | 1 |
| Total | 100 | 100 | 100 |
| Refractive index | 1.92 | 1.56 | — |

As shown in this table, each core 52 is constituted by a transparent glass composed of $SiO_2$, $Al_2O_3$, $K_2O$, and PbO and has a refractive index of 1.92, as in the case of each core 32. Each cladding 53 is constituted by a transparent glass composed of $SiO_2$, $Al_2O_3$, $Na_2O$, $K_2o$, and PbO and has a refractive index of 1.56. As in the case of the light absorber 34, the light absorber 54 is a black glass composed of $SiO_2$, $K_2O$, PbO, $MnO_2$, and $Cr_2O_3$.

The light absorber 54 is provided for attenuating or removing light entering the claddings 53. Namely, if the light absorber 54 were not provided, light incident on the claddings 53 from the output end faces 35b of the cores 32 in the first member 20 could be transmitted through these claddings 53 to enter the cores 52 adjacent thereto. Consequently, light incident on one of the cores 52 and light incident on the cladding 53 surrounding the core 52 may coexist in the core 52, which degrades the positional resolution of the device 10. In view of this point, the light absorber 54 is disposed so as to be in contact with the claddings 53. Since the light absorber 54 absorbs the light incident on the claddings 53 to attenuate or remove this light, the light incident on the claddings 53 and the light incident on the cores 52 are prevented from mixing together. Thereby an optical image with a relatively high resolution can be emitted from the member 40.

As mentioned above, both end faces 55a and 55b of each core 52 are inclined with respect to the axis 58 at the angle $\alpha_2$, and therefore the input end face 42 and output end face 44 are also inclined with respect to each axis 58 at the angle $\alpha_2$. In the fiber optic device 10 in accordance with this embodiment, the angle of inclination $\alpha_2$ is set to a range in which the light rays incident on the cores 52 in the second member 40 from the cores 32 in the first member 20 satisfy a total reflection condition at an interface between each core 52 and cladding 53.

Figure 9:
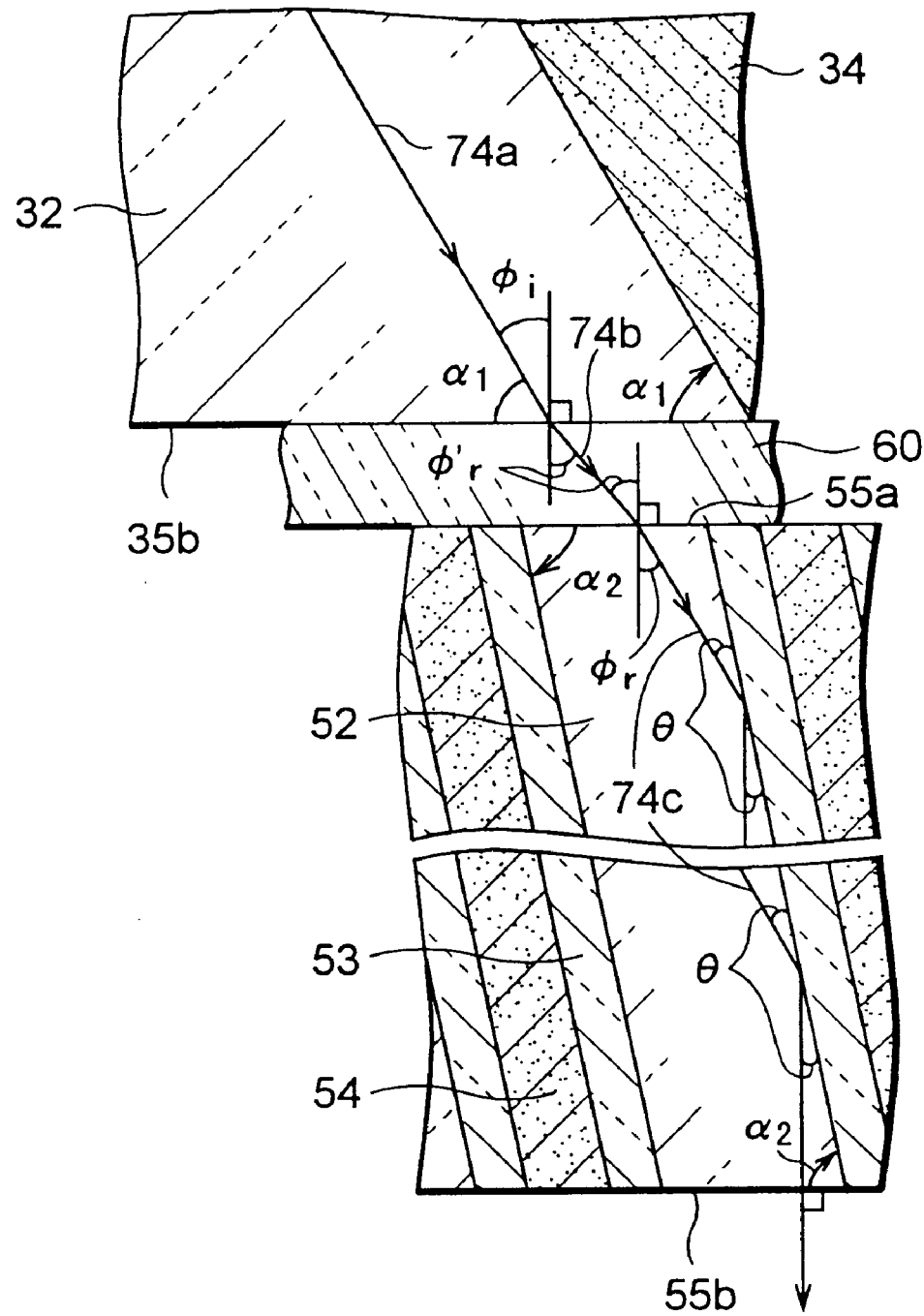
FIG. 9 is a partially enlarged vertical sectional view, in the case of $\alpha_2 \geq 90° - \phi_r$, showing a connecting portion between input-side and output-side fiber optic members, and also showing an end face of the output-side member.

In the following, with reference to FIG. 9, the range of the angle $\alpha_2$ will be explained. FIG. 9 is a partially enlarged vertical sectional view showing a connecting portion between the first and second member 20 and 40. In FIG. 9, referred to with 74a is a light ray propagating through one of the input-side cores 32 in the axial direction thereof toward the end face 35b, 74b is a refracted ray in the adhesive 60 of the ray 74a, and 74c is a refracted ray in the output-side core 52 of the ray 74b. Also, $\phi_i$ is the incident angle of the ray 74a with respect to the interface between the core 32 and the adhesive 60, $\phi_r{'}$ is the angle of refraction of the refracted ray 74b, $\phi_r$ is the angle of refraction of the refracted ray 74c, and $\theta$ is the supplementary angle of the incident angle of the light ray 74c with respect to the interface between the core 52 and the cladding 53.

Assuming that the refractive index of the input-side core 32 is $n_{1core}$, the refractive index of the adhesive 60 is $n_{AD}$, the refractive index of the output-side core 52 is $n_{2core}$, and the refractive index of the cladding 53 is $n_{2clad}$, Snell's law at the interface between the input-side core 32 and the adhesive 60 and at the interface between the adhesive 60 and the output-side core 52 are respectively represented as:

$$n_{1core}\cdot\sin\phi_i = n_{AD}\cdot\sin\phi_r{'}, \quad (6)$$

$$n_{AD}\cdot\sin\phi_r{'} = n_{2core}\cdot\sin\phi_r. \quad (7)$$

Also, as can be seen from FIG. 9, $$\alpha_1 + \phi_i = 90° \quad (8)$$

holds true. Further, in FIG. 9, concerning the interior angles of a triangle surrounded by the interface between the core 52 and the cladding 53, the light ray 74c, and the end face 55a, $$(90° - \phi_r) + (180° - \alpha_2) + \theta = 180° \quad (9)$$

holds true.

From the above equations, the angle of inclination $\alpha_2$ of the end faces 55a and 55b is represented as:

$$\alpha_2 = \cos^{-1}(n_{1core}\cdot\cos\alpha_1/n_{2core}) + \theta. \quad (10)$$

On the other hand, in order for the ray incident on the output-side core 52 from the input-side core 32 to satisfy the total reflection condition at the interface between the core 52 and the cladding 53, it is necessary that the incident angle of the ray with respect to this interface is not smaller than the critical angle of reflection at this interface. In other words, it is necessary that the supplementary angle of the above incident angle is not greater than the supplementary angle of the critical angle, namely:

$$0 \leq \theta \leq \theta_c (= \cos^{-1}(n_{2clad}/n_{2core})) \quad (11)$$

holds true, wherein $\theta_c$ is the supplementary angle of the critical angle at the interface between the core 52 and the cladding 53.

From the above expressions (10) and (11), the range of the angle $\alpha_2$ in which the light incident on the output-side core 52 from the input-side core 32 satisfies the total reflection condition at the above interface is determined as:

$$\cos^{-1}(n_{1core}\cdot\cos\alpha_1/n_{2core}) \leq \alpha_2 \leq \cos^{-1}(n_{1core}\cdot\cos\alpha_1/n_{2core}) + \cos^{-1}(n_{2clad}/n_{2core}). \quad (12)$$

Figure 9A:
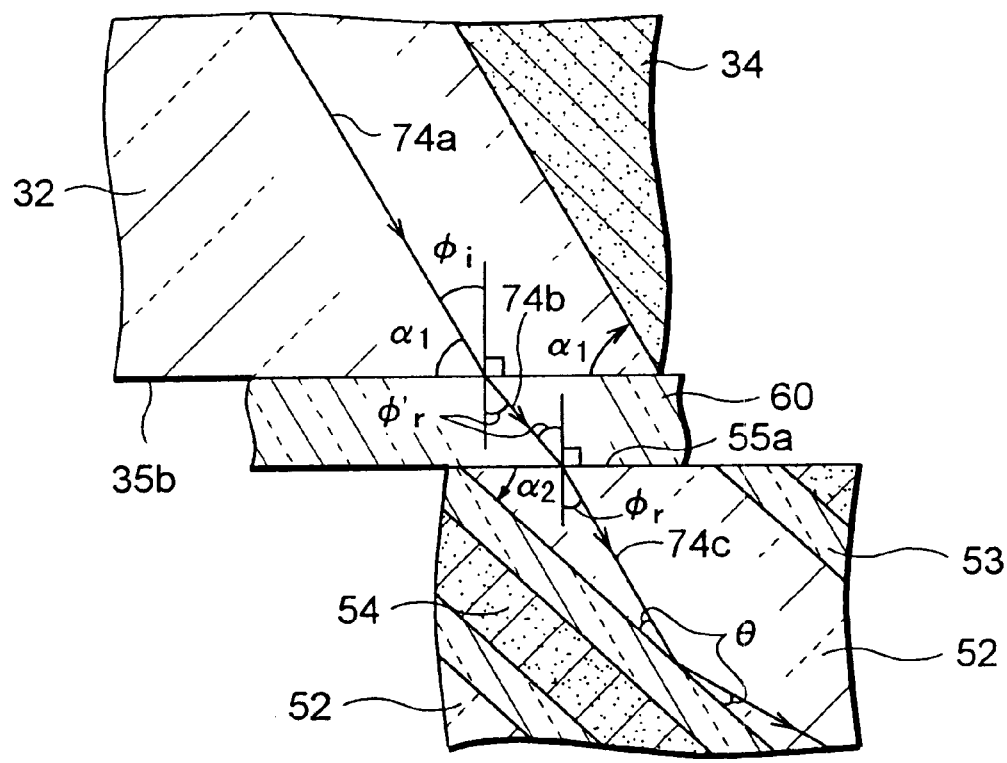
FIG. 9A is a partially enlarged vertical sectional view showing a connecting portion between input-side and output-side fiber optic members in the case of $\alpha_2 \leq 90° - \phi_r$.

The angle $\alpha_2$ satisfies $\alpha_2 \geq 90° - \phi_r$ in the above explanation with reference to FIG. 9, however, in the case of $\alpha_2 \leq 90° - \phi_r$, the ray 74c may satisfy the total reflection condition at the interface between the core 52 and the cladding 53. FIG. 9A is a partially enlarged vertical sectional view, in the case of $\alpha_2 \leq 90° - \phi_r$, showing a connecting portion between the first and second member 20 and 40. In FIG. 9A, concerning the interior angles of a triangle surrounded by the interface between the core 52 and the cladding 53, the light ray 74c, and the end face 55a, $$(90° + \phi_r) + \alpha_2 + \theta = 180° \quad (9A)$$

holds true. Also, the above equations (6) to (8) hold true in this case. From these equations (6) to (8) and (9A), the angle $\alpha_2$ is represented as:

$$\alpha_2 = \cos^{-1}(n_{1core}\cdot\cos\alpha_1/n_{2core}) - \theta. \quad (10A)$$

From the above expressions (10A) and (11), the range of the angle $\alpha_2$ in which the light incident on the output-side core 52 from the input-side core 32 satisfies the total reflection condition at the interface between the core 52 and the cladding 53 in the case of $\alpha_2 \leq 90° - \phi_r$ is determined as:

$$\cos^{-1}(n_{1core}\cdot\cos\alpha_1/n_{2core}) - \cos^{-1}(n_{2clad}/n_{2core}) \leq \alpha_2 \leq \cos^{-1}(n_{1core}\cdot\cos\alpha_1/n_{2core}). \quad (12A)$$

At last, from the above expression (12) and (12A), the range of the angle of inclination $\alpha_2$ in which the light from the input-side core 32 satisfies the total reflection condition at the above interface is represented as:

$$\cos^{-1}(n_{1core}\cdot\cos\alpha_1/n_{2core}) - \cos^{-1}(n_{2clad}/n_{2core}) \leq \alpha_2 \leq \cos^{-1}(n_{1core}\cdot\cos\alpha_1/n_{2core}) + \cos^{-1}(n_{2clad}/n_{2core}). \quad (12B)$$

Since $n_{1core} = 1.92$, $n_{2core} = 1.92$, $n_{2clad} = 1.56$, and $\alpha_1 = 58.6°$, we obtain from the inequality (12B)

$$22.9° \leq \alpha_2 \leq 94.3°. \quad (13)$$

Further, the angle of inclination $\alpha_2$ in this embodiment is defined so that, within the range represented by the above inequality (13), light rays advancing through each output-side core 52 are emitted from the output end face 55b in a direction perpendicular to this end face. When the value of angle $\alpha_2$ is thus set, the light rays propagating through the cores 52 can always be emitted from the output end face 44 regardless of the medium adjacent to this end face.

Referring to FIG. 9, when both $\alpha_1$ and $\alpha_2$ are acute angles, concerning the interior angles of a triangle surrounded by the interface between the core 52 and the cladding 53, the ray 74c, and the end face 55b, $$\alpha_2 + \theta = 90° \quad (14)$$

holds true. From this equation and the above expression (10), the angle of inclination $\alpha_2$ is represented as:

$$\alpha_2 = (\cos^{-1}(n_{1core}\cdot\cos\alpha_1/n_{2core}) + 90°)/2. \quad (15)$$

Since $n_{1core} = 1.92$, $n_{2core} = 1.92$, and $\alpha_1 = 58.6°$, we obtain $\alpha_2 = 74.3°$. This value satisfies the above inequality (13).

Here, as indicated by the above inequality (13), there may be a case where the angle $\alpha_2$ is 90°. Therefore, it is not always necessary for the input and output end faces 42 and 44 of the second member 40 to be inclined with respect to the core axes 58. Accordingly, the angle $\alpha_2$ should be referred to as "the angle formed between the end face of the second fiber optic member 40 and the core axis 58 in this member." This angle $\alpha_2$ may be an obtuse angle. However, when $\alpha_1$ is an acute angle while $\alpha_2$ is an obtuse angle, the light propagating through the cores 52 cannot be emitted in the direction perpendicular to the end faces 55b.

The case where $\alpha_1$ is an obtuse angle corresponds to a case where the present device 10 is observed from the side opposite to that explained in the foregoing, i.e., observed from the direction opposite to the arrows accompanying II—II line in FIG. 1. Thereby the case where $\alpha_1$ is an obtuse angle can be considered similar to the case where $\alpha_1$ is an acute angle. Namely, the case where $\alpha_1$ and $\alpha_2$ are respectively obtuse and acute angles is similar to the case where $\alpha_1$ and $\alpha_2$ are respectively acute and obtuse angles, and the case where both $\alpha_1$ and $\alpha_2$ are obtuse angles is similar to the case where both $\alpha_1$ and $\alpha_2$ are acute angles.

As for the above-mentioned conventional fiber optic device in which the cores and claddings thereof respectively have the same refractive indices as those in the output-side member 40, the angle of inclination $\alpha_0$ of the end face of this device is determined as $\alpha_0 \leq 23.0°$ according to the above expression (1). In the device 10 of this embodiment, since the range of angle $\alpha_2$ is $22.9° \leq \alpha_2 \leq 94.3°$ as noted above, the angle $\alpha_2$ can be set to a value larger than that of the angle $\alpha_0$ of inclination of the output end face in the prior art. Thus, in the device 10, the angle formed between the output end face 44 and the core axis 58 in the output-side member 40 can be set to a value nearer to 90°. Therefore the inclination of the side faces 45 and 46 with respect to the output end face 44 can be made relatively slight.

As can be seen from the above equation (4), the higher the refractive index of the core 32 in the input-side member 20 is, the greater the maximum angle of inclination $\alpha_{1m}$ of the input end face 22 becomes. Also, as can be seen from the above equation (15), when the refractive index of the core 32 and the angle of inclination $\alpha_1$ are respectively set to predetermined values, the higher the refractive index of the core 52 in the output-side member 40 is, the greater becomes the value of the angle $\alpha_2$ at which the core-propagating light is perpendicularly emitted from the output end face 44 of the device 10. Further, as can be seen from the above equation (15), when the refractive indices of both of the core 32 and core 52 are respectively set to predetermined values, the larger the angle of inclination $\alpha_1$ is, the greater becomes the value of angle $\alpha_2$ at which the core-propagating light is perpendicularly emitted from the output end face 44. In view of these points, in order to increase the angles $\alpha_1$ and $\alpha_2$ when the device 10 is designed so that the core-propagating light is perpendicularly emitted from the output end face 44, it is preferred that the refractive indices of both of the core 32 and core 52 are set as high as possible.

As mentioned above, the angle of inclination $\alpha_1$ of the input end face 22 of the fiber optic device 10 can be made greater than the angle of inclination of the input end face of the conventional fiber optic device. Also, the angle $\alpha_2$ formed between the output end face 44 of the device 10 and each core axis in the second member 40 can be set to a value nearer to 90° than is the angle of inclination of the output end face in the conventional fiber optic device. Thus, in the fiber optic device 10 in accordance with this embodiment, since the inclination of the side faces 45 and 46 with respect to the output end face 44 can be made relatively slight, the device 10 can be easily attached to a photodetector such as CCD imaging device. Also, since the inclination of the side faces 25 and 26 with respect to the input end face 22 and the inclination of the side faces 45 and 46 with respect to the output end face 44 are both relatively slight, the device 10 can have a relatively small width. Accordingly, a compact light receiving member can be manufactured by attaching the device 10 to a photodetector.

Figure 10:
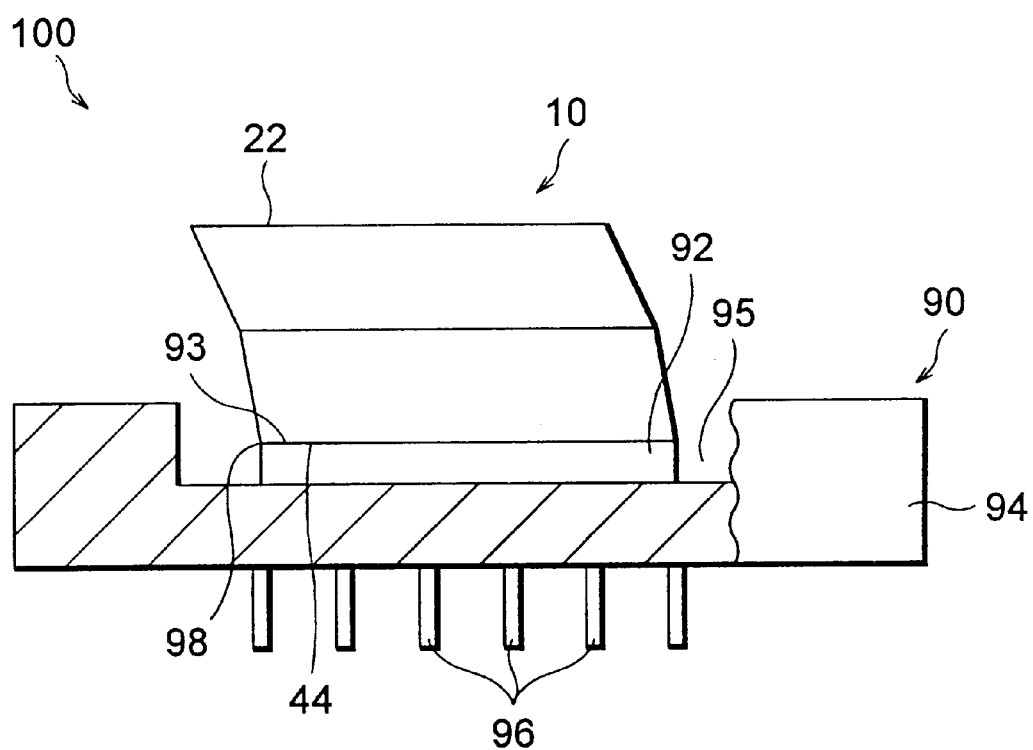
FIG. 10 is a schematic view showing a light receiving member in which the fiber optic device in accordance with the embodiment is attached to a CCD imaging device.

FIG. 10 is a schematic view showing a light receiving member 100 in which the fiber optic device 10 is attached to a CCD imaging device 90, which is an example of a photodetector. This imaging device 90 comprises a CCD chip 92 disposed within a depression 95 of a housing 94. The imaging device 90 converts, upon photoelectric conversion, an optical image incident on a light receiving surface 93 of the CCD chip 92 into an electric signal. This electric signal is outputted by way of lead terminals 96 extending through the housing 94 to the outside. The output end face 44 of the device 10 is bonded to the light receiving surface 93 by means of an optical adhesive 98. As with the optical adhesive 60 used for bonding the first member 20 and the second member 40 together, any of balsams, epoxy resin adhesives, ultraviolet curing resins, and the like can be used as the optical adhesive 98. In this embodiment, Cemedine-1565 is used as the adhesive 98.

Figure 11:
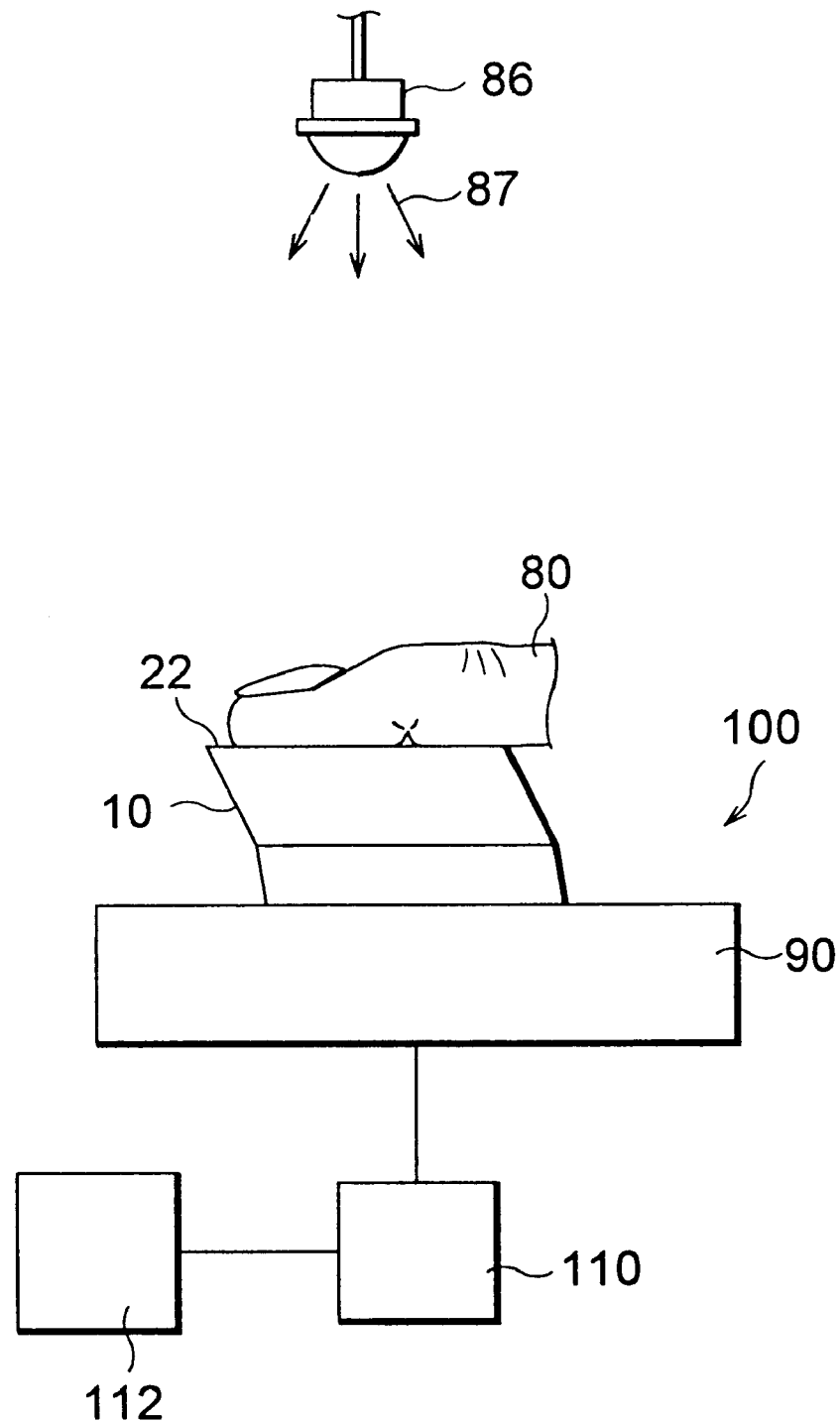
FIG. 11 is a schematic view showing a configuration of a fingerprint acquisition apparatus comprising the light receiving member of FIG. 10.

This light receiving member 100 can be used in an apparatus for acquiring an irregularity pattern on an object surface such as a fingerprint. FIG. 11 is a schematic view showing a configuration of a fingerprint acquisition apparatus using the light receiving member 100. In addition to the light receiving member 100, this fingerprint acquisition apparatus comprises a light source 86 for illuminating the input end face 22 of the light receiving member 100, a signal processing unit 110 electrically connected to the lead terminals 96 of the light receiving member 100, and a display 112 electrically connected to the signal processing unit 110. When the finger 80 is pushed onto the input end face 22 so as to come into close contact with the input end face 22 and then is irradiated with rays 87 from the light source 86, a fingerprint pattern optical image enters the fiber optic device 10 through the input end face 22. This fingerprint pattern image is transmitted to the output end face 44 and then emitted therefrom to enter the light receiving surface 93 of the CCD chip 92. Consequently, the fingerprint pattern image of the finger 80 is converted into an electric signal to be fed into the signal processing unit 110. The unit 110 performs appropriate processing based on the output from the CCD imaging device 90 and sends the resulting image signal to the display 112. Thus the fingerprint pattern image is displayed on a screen of the display 112.

In the fiber optic device 10 of this embodiment, since the above-mentioned angle $\alpha_2$ is set so that the core-propagating light is emitted perpendicularly from the output end face 44, the light emitted from this end face is securely made incident on the light receiving area of the CCD imaging device 90. This increases the S/N in the output of the CCD imaging device 90 and enables the detection of a pattern with a high resolution or a relatively high brightness.

Figure 12:
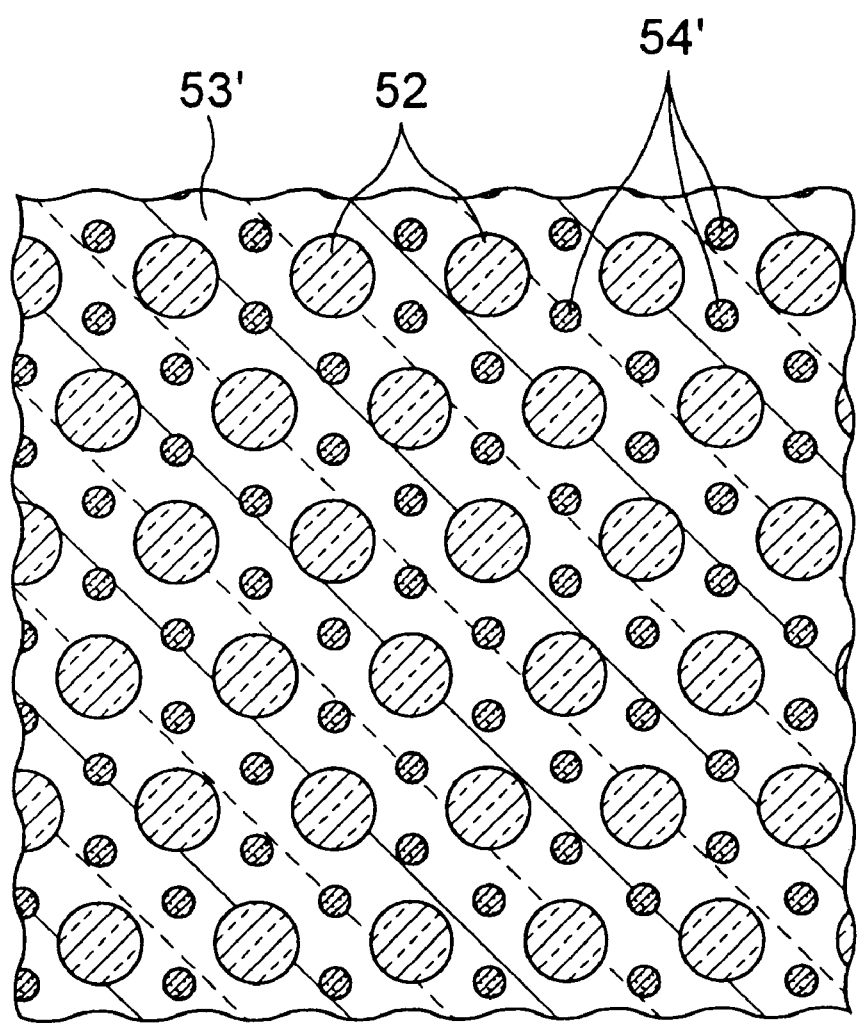
FIG. 12 is a partially transverse sectional view showing an output-side fiber optic member in accordance with a modified example.
Figure 13:
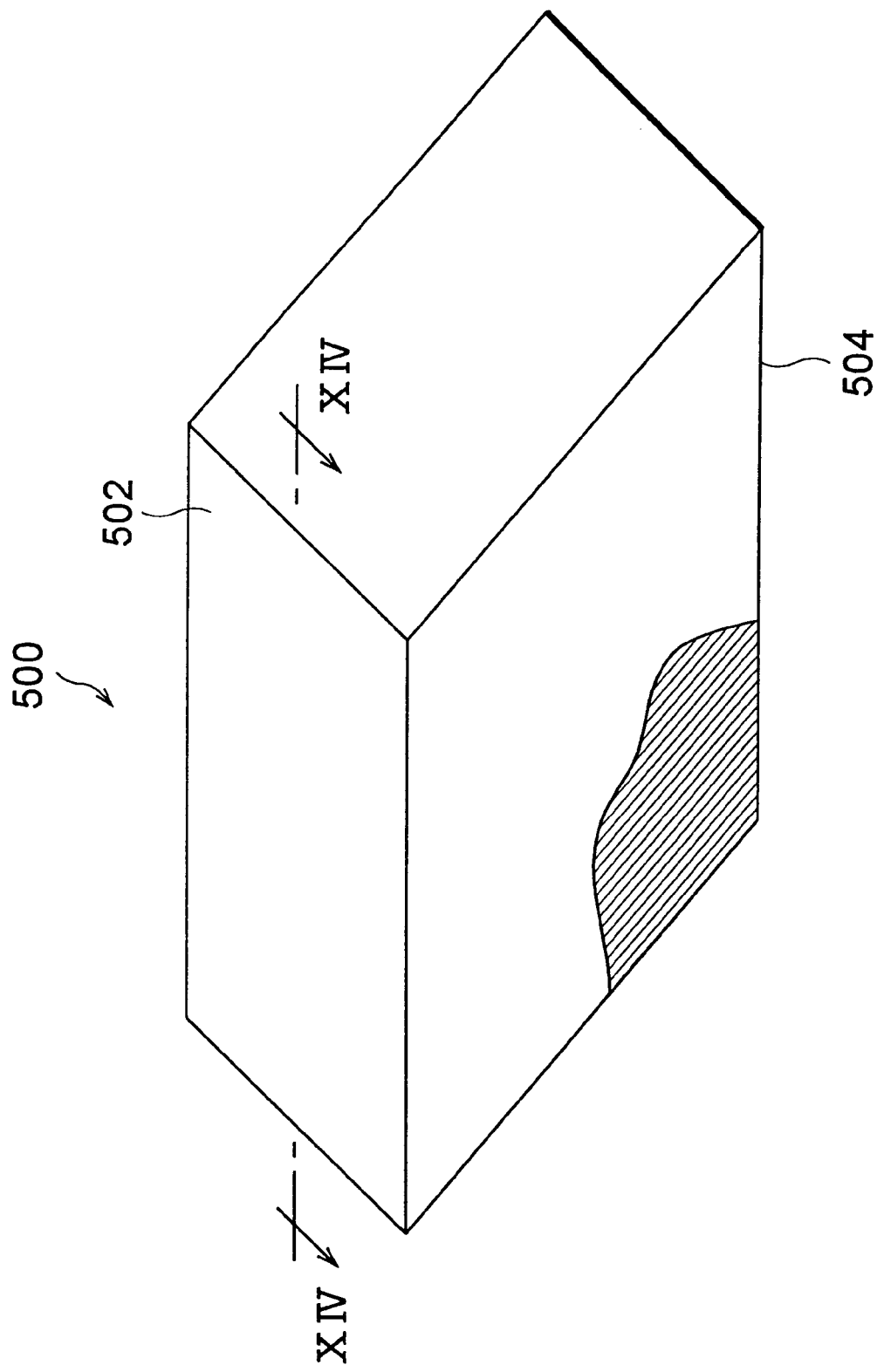
FIG. 13 is an overall perspective view showing a conventional fiber optic device.
Figure 14:
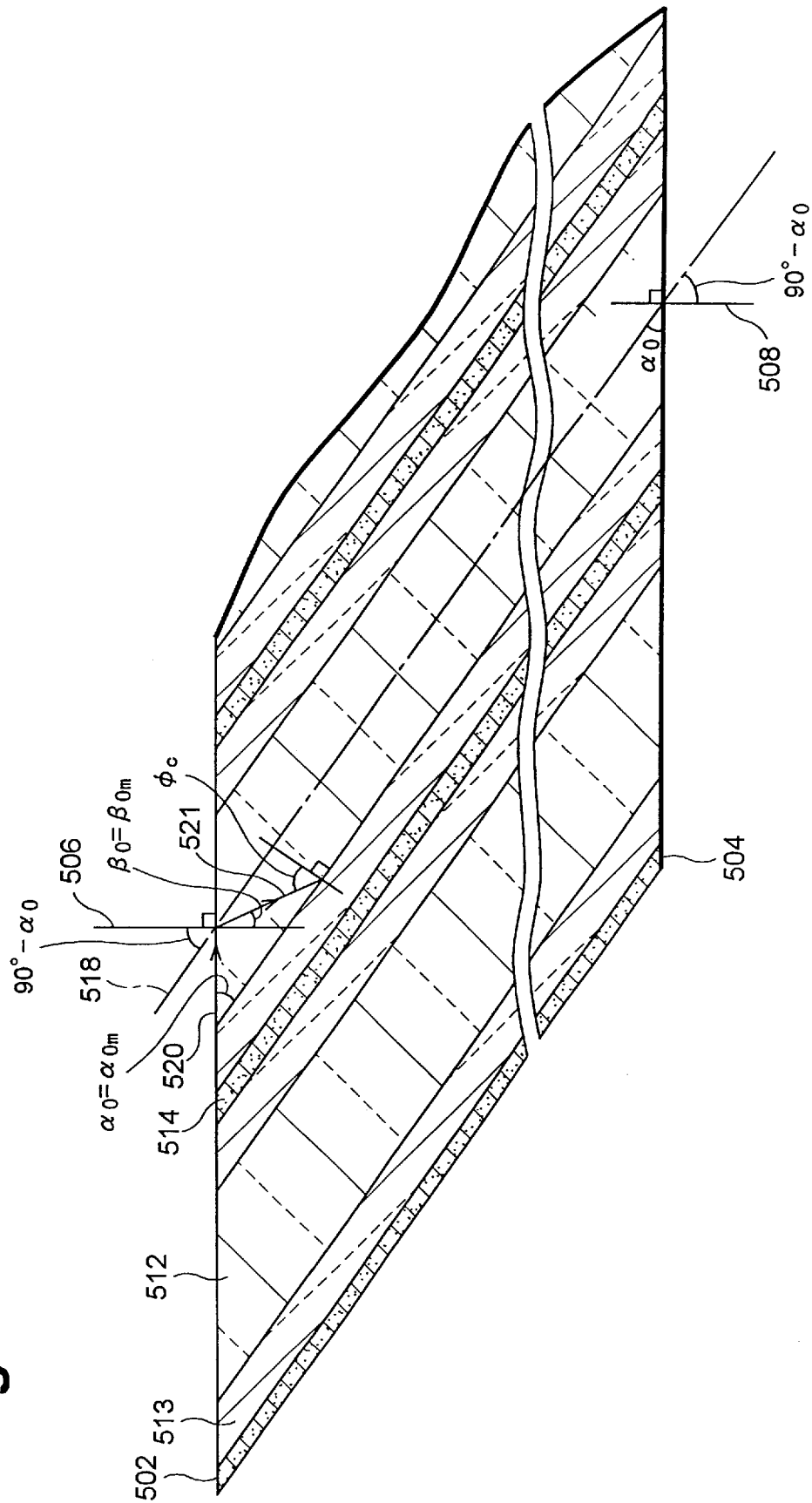
FIG. 14 is a partially vertical sectional view of the fiber optic device taken along line XIV—XIV of FIG. 13.

Without being restricted to the above-mentioned embodiment, the present invention can be modified in various manners. For example, though the light absorber 54 of the output-side member 40 in the above-mentioned embodiment is disposed so as to surround the side face of each cladding 53, it should not be restricted to such an arrangement. FIG. 12 is a transverse sectional view of an output-side fiber optic member in accordance with a modified example including light absorbers 54' that are different from light absorber 54 of the above-mentioned embodiment. In the output-side member shown in this drawing, the rod-shaped light absorbers 54' extending parallel to the cores 52 are embedded in a cladding 53' surrounding the side surface of each core 52.

Also, though the output-side fiber optic member 40 in the above-mentioned embodiment comprises the light absorber 54, a fiber optic member comprising only cores and a cladding surrounding the cores, with no light absorber, may be used as the output-side fiber optic member. As mentioned above, however, when the output-side member comprises a light absorber, the light travelling through the cladding is attenuated or removed as being absorbed by the light absorber; this can restrain or prevent the phenomenon where the light incident on the cladding enters each core to coexist with the core-propagating light therein and which degrades the resolution of a pattern image. Therefore, it is preferred that the output-side member comprises a light absorber.

Further, though the input-side member 20 and the output-side member 40 are bonded together by means of the optical adhesive 60 in the above-mentioned embodiment, they may be connected together by other methods. For example, a sealant may be disposed between the output end face 24 of the input-side member 20 and the input end face 42 of the output-side member 40, and then an adhesive tape or the like may be used to connect both members together. As the sealant, any material which has a translucency and can prevent air from intervening between the output end face 24 and the input end face 42, e.g., refractive-index matching material such as matching oil, may be used.

Furthermore, the fiber optic device 10 in accordance with this embodiment is configured so that the core-propagating light is emitted perpendicularly to the output end face 44. Consequently, the light can be emitted from the output end face 44 regardless of the medium adjacent to this end face, which enables a wider range of application of the device 10. Though explained above is the case in which the fiber optic device 10 is secured to the CCD chip 92 by means of an optical adhesive, it should not be restricted to such a case. For example, the fiber optic device 10 and a photodetector may be separated from each other, and a lens may be disposed in the air gap therebetween so as to optically connect them together.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 195077/1996 filed on Jul. 24, 1996 is incorporated herein by reference.

What is claimed is:

1. A fiber optic device comprising:

a first fiber optic member including a plurality of first cores substantially parallel to each other extending in a predetermined direction and a first light absorber which is in direct contact with and surrounds a side face of each of said first cores, said first absorber having an absorption coefficient that is greater than that of each of said first cores with respect to at least one wavelength of light, opposite end faces of said first cores and of said first light absorber being respectively collected so as to become flush with each other to form input and output end faces of said first fiber optic member; and a second fiber optic member including a plurality of second cores substantially parallel to each other extending in a predetermined direction and a cladding which surrounds a side face of each of said second cores and has a refractive index that is lower than that of each of said second cores, opposite end faces of said second cores and of said cladding are respectively collected so as to become flush with each other to form input and output end faces of said second fiber optic member;

said second fiber optic member being connected to said first fiber optic member so that the input end face of said second fiber optic member opposes the output end face of said first fiber optic member, the input end face of said first fiber optic member being inclined with respect to the axis of each of said first cores at a predetermined angle $\alpha_1$.

2. A fiber optic device comprising:

a first fiber optic member including a plurality of first cores substantially parallel to each other extending in a predetermined direction, and a first light absorber which surrounds a side face of each of said first cores and has an absorption coefficient that is greater than that of each of said first cores with respect to at least one wavelength of light, opposite end faces of said first cores and of said first light absorber being respectively collected so as to become flush with each other to form input and output end faces of said first fiber optic member; and a second fiber optic member including a plurality of second cores substantially parallel to each other extending in a predetermined direction, and a cladding which surrounds a side face of each of said second cores and has a refractive index that is lower than that of each of said second cores, opposite end faces of said second cores and of said cladding are respectively collected so as to become flush with each other to form input and output end faces of said second fiber optic member;

said second fiber optic member being connected to said first fiber optic member so that the input end face of said second fiber optic member opposes the output end face of said first fiber optic member, the input end face of said first fiber optic member being inclined with respect to the axis of each of said first cores at a predetermined angle $\alpha_1$;

wherein said angle $\alpha_1$ satisfies:

$$\alpha_1 \leq 90° - \sin^{-1}(n_a/n_{1core}),$$

where $n_a$ is a refractive index of the air, and $n_{1core}$ is a refractive index of each of said first cores.

3. A fiber optic device according to claim 2, wherein the input end face and output end face of said first fiber optic member are substantially parallel to each other;

wherein the input end face and output end face of said second fiber optic member are substantially parallel to each other; and wherein said first and second fiber optic members are connected together so that the output end face of said first fiber optic member and the input end face of said second fiber optic member are substantially parallel to each other.

4. A fiber optic device according to claim 3, wherein angle $\alpha_2$ formed between the end face of said second fiber optic member (40) and the axis (58) of each of said second cores (52) satisfies:

$$\cos^{-1}(n_{1core} \cdot \cos \alpha_1/n_{2core}) - \cos^{-1}(n_{2clad}/n_{2core}) \leq \alpha_2 \leq \cos^{-1}(n_{1core} \cdot \cos \alpha_1/n_{2core}) + \cos^{-1}(n_{2clad}/n_{2core}),$$

where $n_{1core}$ is a refractive index of each of said first cores, $n_{2core}$ is a refractive index of each of said second cores, and $n_{2clad}$ is a refractive index of said cladding.

5. A fiber optic device according to claim 4, wherein said angle $\alpha_2$ satisfies:

$$\alpha_2 = (\cos^{-1}(n_{1core} \cdot \cos \alpha_1/n_{2core}) + 90°)/2.$$

6. A fiber optic device according to claim 2, wherein the angle formed between the input and end face of said second fiber optic member and the axis of each of said second cores is set so that light rays entering each of said second cores from said first fiber optic member are incident on an interface between each of said second cores and said cladding at an incident angle not smaller than the critical angle of reflection at said interface.

7. A fiber optic device according to claim 2, wherein the angle formed between the output end face of said second fiber optic member and the axis of each of said second cores is set so that light rays entering each of said second cores from said first fiber optic member are emitted from the output end face of said second fiber optic member in a direction perpendicular to this output end face.

8. A fiber optic device according to claim 2, wherein said first and second fiber optic members are connected to each other with a seal layer made of a light transmissive material, said seal layer being disposed between the output end face of said first fiber optic member and the input end face of said second fiber optic member.

9. A fiber optic device according to claim 2, wherein said second fiber optic member further includes a second light absorber which is in contact with said cladding extending along it, said second light absorber having an absorption coefficient greater than that of said cladding with respect to at least one wavelength of light, opposite end faces of said second light absorber respectively terminating at the input and output end faces of said second fiber optic member.

10. A fiber optic device according to claim 2, wherein said first cores are spaced uniformly so that the distance between axes of neighboring first cores is set to a predetermined value, and wherein said second cores are spaced uniformly so that the distance between axes of neighboring second cores is set to a value smaller than said predetermined value.

11. A light receiving member comprising:

the fiber optic device according to claim 2; and a photodetector which converts an optical image incident on its light receiving surface into an electric signal and outputs said electric signal, said photodetector being disposed so that the optical image emitted from the output end face of the second fiber optic member in said fiber optic device enters said light receiving surface.

12. A pattern acquisition apparatus comprising:

the light receiving member according to claim 11; and a light source for illuminating the input end face of the first fiber optic member in said fiber optic device included in said light receiving member.

* * * * *